US005373488A

United States Patent [19]

Lidor

[11] Patent Number: 5,373,488

[45] Date of Patent: Dec. 13, 1994

[54] TELEPHONE ALARM

[76] Inventor: Rony Lidor, 3591 Multiview Dr., Los Angeles, Calif. 90068

[21] Appl. No.: 166,052

[22] Filed: Dec. 13, 1993

[51] Int. Cl.[5] ........ G04B 47/02; G04B 23/02; H04M 11/04

[52] U.S. Cl. ........ 368/13; 368/73; 368/250; 379/38; 379/40; 379/110

[58] Field of Search ........ 368/1, 4, 10, 12, 13, 368/72–74, 250, 251; 379/40, 41, 48, 51, 67, 74, 93, 102, 110, 217, 374, 375

[56] References Cited

U.S. PATENT DOCUMENTS

| | | | |
|---|---|---|---|
| D. 297,428 | 8/1988 | McElroy | D14/72 |
| D. 323,655 | 2/1992 | Bethea et al. | D14/144 |
| 3,029,593 | 4/1962 | Gerace | 58/16 |
| 3,733,440 | 5/1973 | Sides | 179/18 B |
| 3,943,288 | 3/1976 | Reed et al. | 179/2 TC |
| 4,072,825 | 2/1978 | McLay et al. | 179/18 B |
| 4,406,925 | 9/1983 | Jordan et al. | 179/18 B |
| 4,924,499 | 5/1990 | Serby | 379/200 |
| 4,994,908 | 2/1991 | Kuban et al. | 358/86 |
| 5,128,979 | 7/1992 | Reich et al. | 379/40 |

*Primary Examiner*—Vit W. Miska

*Attorney, Agent, or Firm*—Robbins, Berliner & Carson

[57] ABSTRACT

An alarm clock produces a wake-up sound by simulating an incoming telephone and causing the telephone to ring. The alarm clock has a timing device for generating an alarm signal at a programmable time instant and a circuit responsive to the alarm signal for sending a signal simulating a standard incoming telephone signal to the telephone through a standard interface of the telephone.

6 Claims, 4 Drawing Sheets

TELEPHONE ALARM

TECHNICAL FIELD OF THE INVENTION

The present invention is related in general to an alarm clock and in particular to an alarm clock which uses a standard telephone set to generate an alarm.

BACKGROUND OF THE INVENTION

An effective way to wake up a sleeping person is to generate an alarm that simulates a telephone call. The reason is because the sound of a telephone ring can usually attract attention more easily and because a sleeping person may have more difficulty in ignoring the telephone ring before he/she can ascertain that the telephone ring is not the result of a real telephone call.

Although prior art alarm clocks have used a telephone set to generate an alarm, they have been found to be unsatisfactory. For example, these prior art alarm clocks generally require modifications to the telephone set and therefore cannot work with existing telephone sets.

SUMMARY OF THE INVENTION

The present invention provides an alarm clock for generating an alarm through a standard telephone set that has a standard input interface for receiving telephone signals and an existing ringing mechanism. The alarm clock has a timing device for generating an alarm signal at a programmable time instant and a circuit responsive to the alarm signal for sending a telephone signal through the standard input interface to the telephone set in simulation of an incoming telephone call to activate the ringing mechanism of the telephone set.

The present invention also provides a method for generating a wake-up alarm. The method includes the steps of storing an alarm set-off time in a memory, continuously comparing the alarm set-off time with a time-of-day clock, and producing a telephone signal to a standard telephone set when the time-of-day clock is equal to the alarm set-off time. The telephone signal is sent to the telephone set through a standard telephone interface in simulation of an incoming telephone call.

Advantageously, means can be added to the alarm clock whereby a message can be sent from the alarm clock through the telephone set to the user when the simulated telephone call is answered. In an enhanced embodiment, a user can program the alarm clock so that different messages (e.g., places and subject matter of different appointments) can be sent at different alarm time instants.

DETAIL DESCRIPTION OF THE PREFERRED EMBODIMENT

Figure 1:
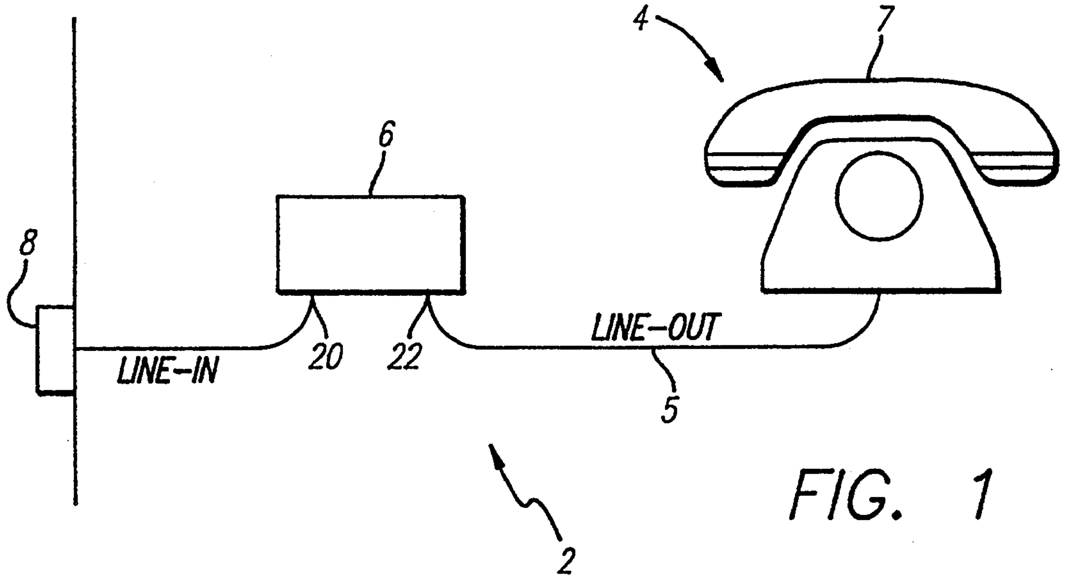
FIG. 1 is a diagram illustrating a typical alarm system having a standard telephone set and an alarm clock wherein the present invention is embodied.

FIG. 1 is a diagram of an alarm system 2 having a standard telephone set 4 and an alarm clock 6. The alarm clock 6 has a standard "line-in" terminal 20 for connection with a telephone socket 8. The alarm clock 6 also has a standard "line-out" terminal 22, such as the conventional connector, for connection with the telephone set 4.

For conventional telephones, the connection includes a "TIP" lead and a "RING" lead, on which different DC and AC voltages are applied to the telephone set 4 through different impedances during various modes to two handset states: On-Hook state (Idle, Ring, Test) and Off-Hook state (Dial, Talk, Test).

For example:

In the Idle mode of the On-Hook state, $-48\pm6$ Vdc is applied to the Ring lead through 500–2500 Ω and the Tip lead is terminated to ground with 0–750 Ω. External line resistance (i.e., between telephone company central switchboard and subscriber's telephone set) is typically up to 1300 Ω.

In the Ring Mode of the On-Hook state, $86\pm2$ Vrms at 20 Hz is applied on top of the DC bias to the Ring lead. Typical ringing specification is 2 second bursts at 6 second intervals.

In the Test mode of the On-Hook state, various AC and DC signals are applied between any pair of the tip ring and ground conductors such as a DC voltage of $-165$ V$\div$202 V and an AC voltage of up to 45 Vrms.

In the Dial mode of Off-Hook state, i.e., when the telephone goes into Off-hook (such as when the handset is picked up), a DC voltage of $-43\div-79$ V is applied. The polarity of the voltage, however, may be reversed at the discretion of the telephone company. The AC dial tone is of about 250 mVrms/400 Hz. These signals are applied through $200\pm50$ Ω series resistance to the Ring lead. The tip lead is terminated to ground by an additional $200+50$ Ω resistance.

In the Talk mode of the Off-Hook state, the same voltage and impedances are present, with audio signals being present on top of the DC bias.

In the Test mode of the Off-Hook state, a 54 Vrms with source resistance as low as 10 Ω is applied The alarm clock 6 functions like a conventional alarm clock. But instead of using an internal buzzer to produce an alarm, alarm clock 6 sends a signal to the telephone set 4 through a standard telephone interface 5 to simulate an incoming telephone call and thereby triggering the internal ringing mechanism (not shown) of the telephone set 4. The alarm is reset when the telephone set 4 is answered, as when the handset 7 of the telephone set 4 is picked up.

Figure 2:
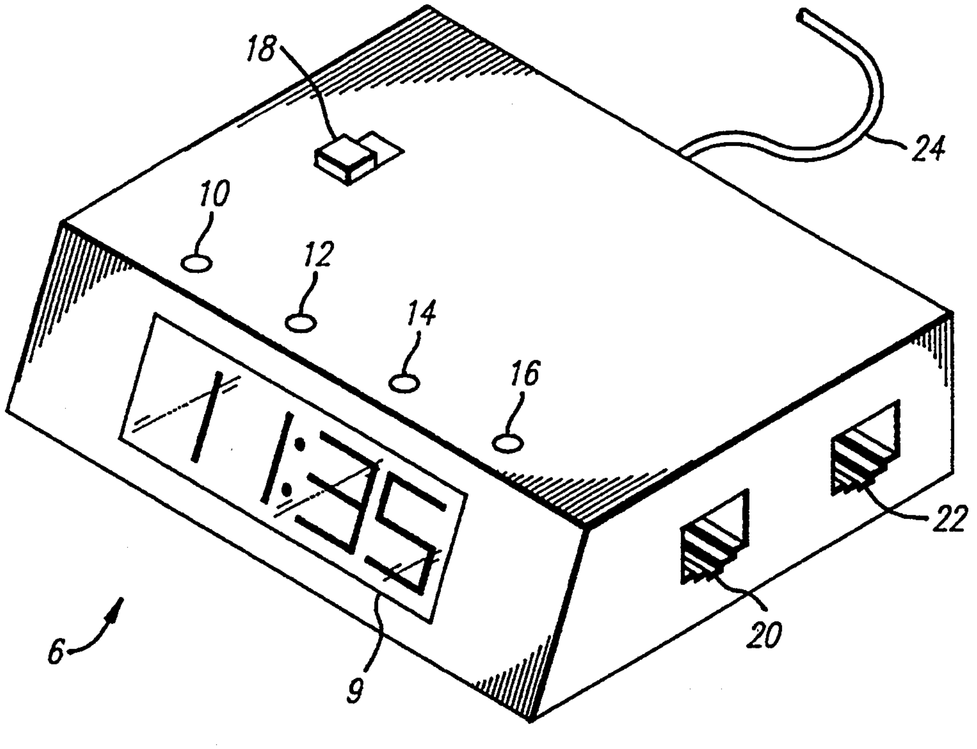
FIG. 2 is a diagram depicting the external design of the alarm clock shown in FIG. 1.

FIG. 2 is a diagram depicting an external design of the alarm clock 6. As shown, alarm clock 6 has a plurality of switches, including a "slow" switch 10, a "fast" switch 12 and a "time" switch 16, for setting the time of day. If the "time" switch 16 is pressed, either the "slow" switch 10 or the "fast" switch 12 can be pressed simultaneously to set the time-of-day value of the clock. The "fast" switch 12 and the "slow" switch 10 can also be used with an "alarm" switch 14 to set the set-off time of the alarm. If the "alarm" switch 14 is pressed, either the "slow" switch 10 or the "fast" switch 12 can be pressed simultaneously to set the set-off time of the alarm. A panel 9 is provided for selectively showing the time of day and the set-off time of the alarm clock 6. An "alarm on/off" switch 18 is provided for selectively enabling and disabling the alarm.

FIG. 2 also shows the "line-in" terminal 20 for connection with the telephone socket 8, the "line-out" terminal 22 for connection with the telephone set 4, and a power cord 24 for connection with an AC power supply.

Figure 3:
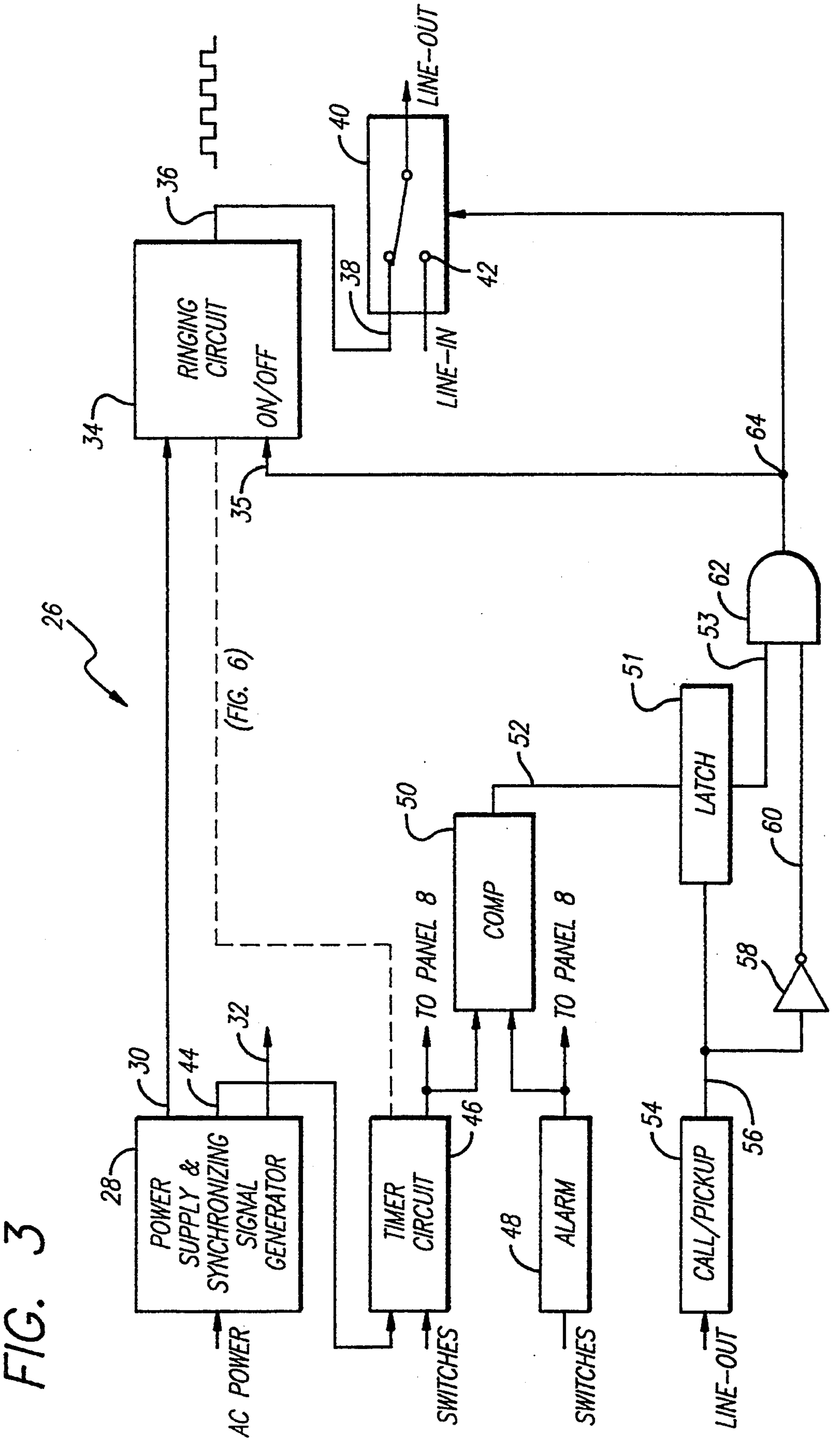
FIG. 3 is a block diagram showing a circuit for generating an alarm signal to a standard telephone set.

FIG. 3 is a block diagram of a circuit 26 for simulating a incoming telephone call when an alarm is set off.

The circuit 26 has a conventional power supply circuit 28 for receiving AC power and rectifying the AC power.

The circuit 26 also has a ringing circuit 34 for producing a ringing signal 36 to the "Ring" lead under the control of an "on/off" signal applied at a terminal 35. The ringing signal 36 can be an AC signal with a 2-second duration once every 6 seconds and a root-mean-square magnitude of 86 volts (Vrms). In one implementation, the ringing circuit 36 is formed by a 20 Hz digital oscillator with a buffer driver and a low-to-high transformer for transforming the output of the oscillator to an 86 Vrms.

Figure 6:
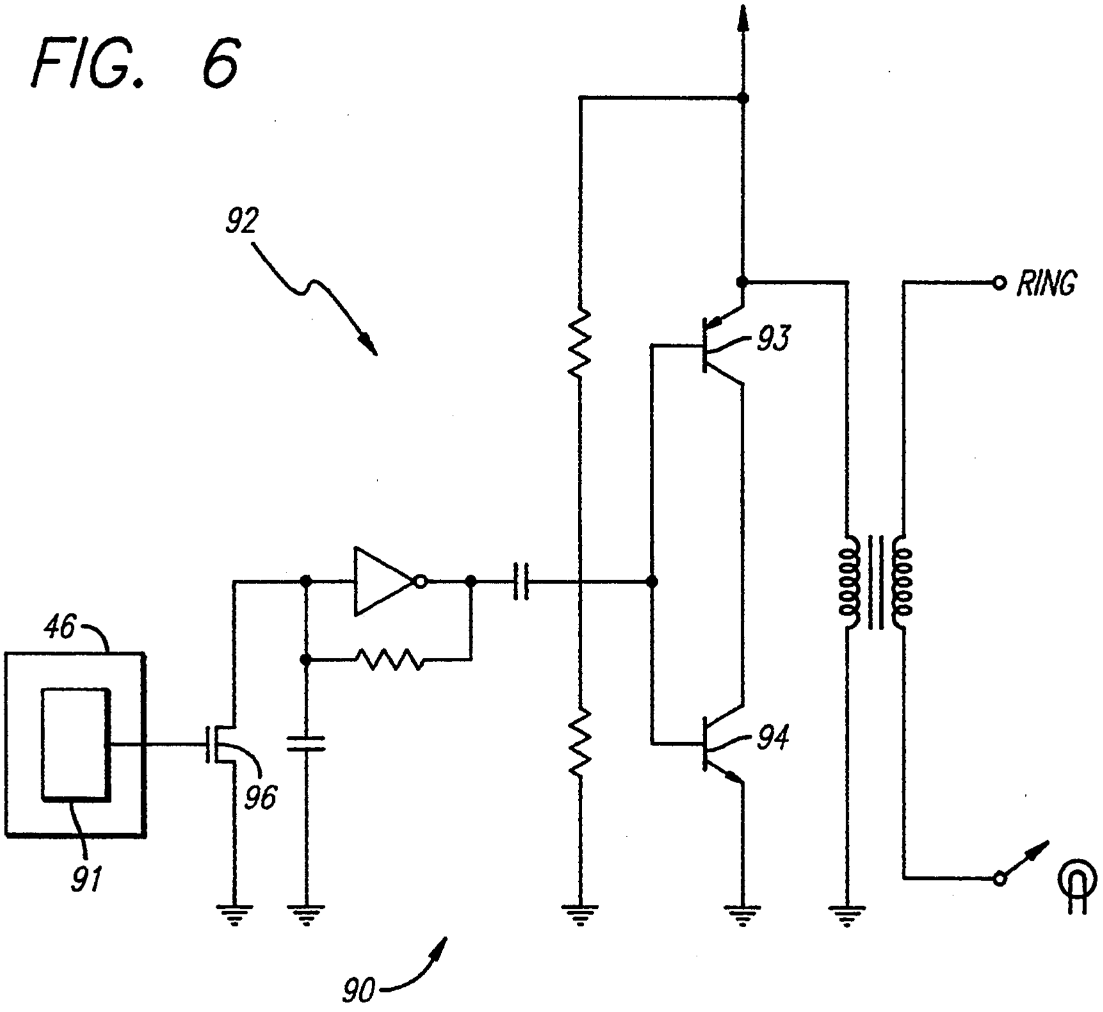
FIG. 6 is a schematic circuit diagram of a circuit for producing a ringing signal.

Another implementation of the ringing circuit 34 is illustrated in FIG. 6. The implementation has a 20 Hz digital oscillator 91, formed, for example, by a Schmidt trigger 92, for producing an AC signal. A timer circuit 46 controls the 2 second bursts every six seconds, such as by controlling a transistor 96 (e.g., a FET). Whenever the transistor 96 is on, the oscillator is disabled. The AC signal is level split by a Schmidt trigger circuit 92 the output of which is used to control two transistors 93 and 94 to switch their common output between two voltage levels, e.g., ground and 120 Vdc to produce an 86 Vrms. Operation of the ringing circuit 36 can be powered by a DC voltage supplied from the power supply circuit 28.

The ringing signal 36 is coupled to an input 38 of a switch 40. Switch 40 also has another input 42 which is connected to the "line-in" terminal 20. For use with the aforementioned conventional telephone connection, block 40 actually represents two separate switches (one for the "Tip" signal and the other for the "Ring" signal) which are controlled by the same control signal 64 from gate 62, so that they connect/disconnect in the same way.

The alarm clock 6 has an internal oscillator for generating a timing signal 44 which is sent to a time-of-day clock circuit 46 for updating the time-of-day value set by the "time" switch 16, the "fast" switch 12 and the "slow" switch 10. Line frequency of the AC power supply can be used to synchronize this oscillator. The electric power company usually maintains an average precise frequency adjusted over a 24 hour circle. This helps the alarm clock to accomplish time accuracy, yet free of the need to implement accurate expensive oscillators, such as quartz oscillators. Otherwise, a quartz oscillator can be used if it turns out to be cheaper and simpler.

Alarm clock 6 has an alarm memory 48 for storing the set-off time of the alarm clock 6 programmed by the "slow" switch 10, the "fast" switch 12 and the "alarm" switch 14. The content of the alarm memory 48 is continuously compared with the output of the time-of-day clock circuit 46 at a comparator 50. An alarm signal 52 is produced by the comparator 50 when output of the time-of-day clock circuit 46 is equal to the content of the alarm memory 48. The alarm signal 52 is applied to a data input (D) of an alarm latch 51 so that an alarm set-off condition is stored in the latch 51.

Alarm clock 6 has a call/picked-up identifying circuit 54 for detecting when the telephone 4 is answered (e.g., when the hand set is picked up). The detection can be accomplished by sensing the input impedance between the "Ring" lead and the "Tip" lead. "On-Hook" input impedance is required by an FCC regulation to be more than 10M Ω and "Off-Hook" impedance is required to be less than 200 Ω. By applying a voltage to one of the leads and measuring the voltage at the other lead, the "On-Hook" and "Off-Hook" state of the telephone 4 can be detected.

The output 56 of the call/picked-up identifying circuit 54 is applied to an inverter 58. The output 60 of the inverter 58 is coupled to an input of an AND-gate 62. The AND-gate 62 has another input which is coupled to the output 53 of the alarm latch 51.

If the telephone set 4 is neither in-use nor answered (i.e., the handset 7 is not picked up), the output 56 of the call/picked-up identifying circuit 56 is "low" and the output 60 of the inverter 58 is "high", thereby enabling the AND-gate 62.

On the other hand, when the telephone set 4 is answered (either as a result of a normal telephone call or as a simulated telephone call generated by the alarm clock 6), the output 56 of the call/picked-up identifying circuit 54 is "high" and the output 60 of the inverter 58 is "low", thereby disabling the AND-gate 62.

If the output 53 of the alarm latch 51 is "high+ when the output 56 of the call/picked-up identifying circuit 54 is "low" (i.e., the telephone set 4 is not being used), the output 64 of the AND-gate 62 is "high". The output 64 of the AND-gate 62 is applied to the on/off input 35 of the ringing circuit 34. When the on/off input 35 is "high", the ringing circuit 34 outputs a ringing signal 36. Moreover, when the output 64 of AND-gate 62 is "high", the switch 40 connects the ringing signal 36 to the "line-out" terminal 22.

The ringing signal 36 is transmitted through the "line-out" terminal 22 to the telephone set 4 to activate a ringing mechanism therein, thereby producing a simulated telephone call.

When the simulated telephone call is answered, as when the handset 7 of the telephone set 4 is picked up, output 56 of the call/picked-up circuit 54 becomes "high", thereby producing a "low" output at the inverter 58 and disabling AND-gate 62. As a result, the ringing circuit 34 is disabled and causing the switch 40 to reconnect the "line-in" terminal to "line-out" terminal, and the telephone set 4 again operates as a standard telephone. The output 56 of the call/picked-up circuit 54 is also applied to the reset input (R) of alarm latch 51. When the output 56 of the call/picked-up circuit 54 is "high", the alarm latch 51 is reset.

Figure 4:
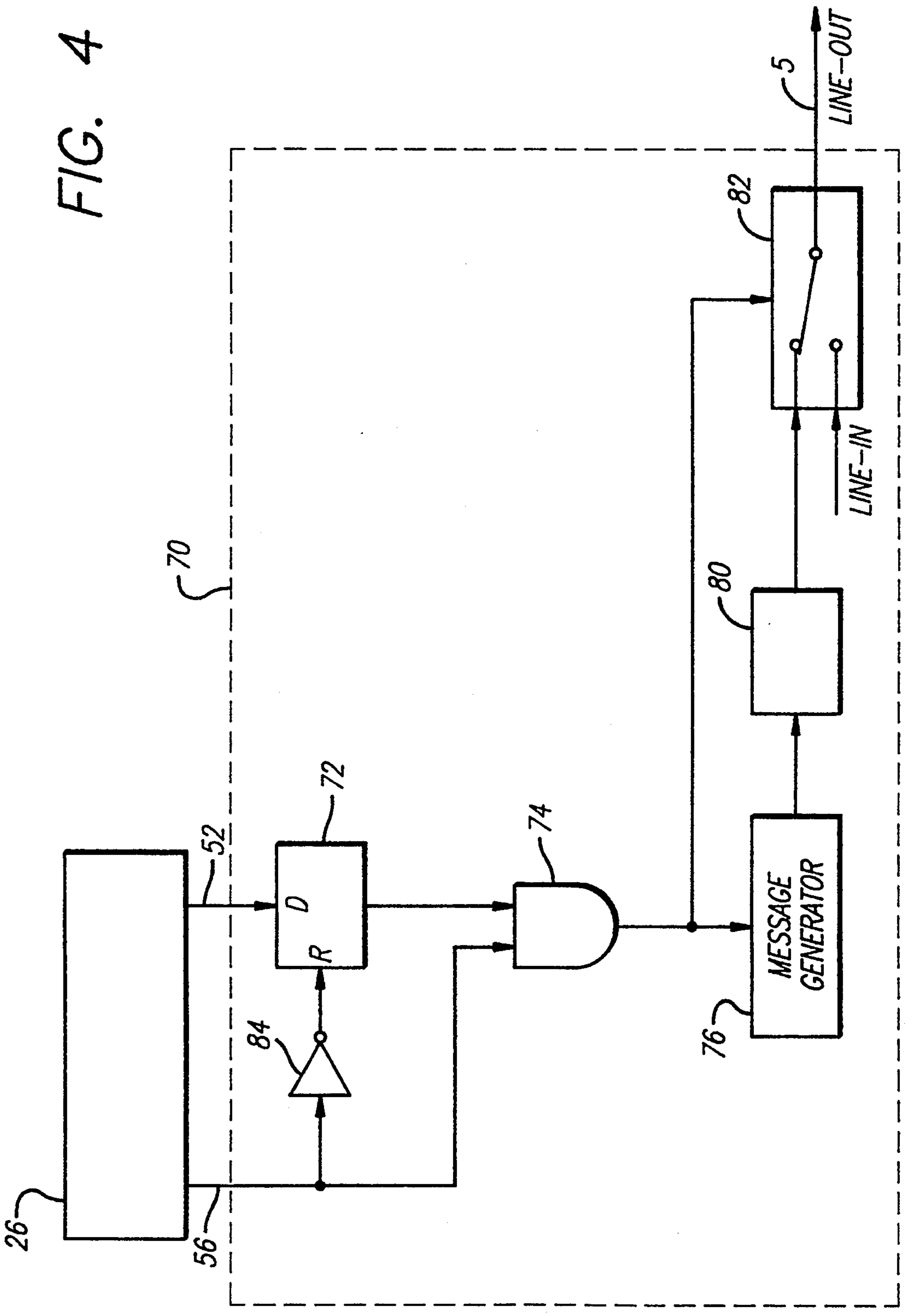
FIG. 4 is a circuit for providing a vocal message when the telephone of FIG. 1 is answered in response to the simulated telephone call.

With reference to FIG. 4, there is shown a circuit 70 which can be added to the circuit 26 to produce a vocal message (e.g., the message which gives the time of day) when an alarm is set off and when the telephone set 4 is answered.

The circuit 70 has a latch 72 which receives the alarm signal 52 from circuit 26 at a data input (D).

The circuit 70 receives the call/picked-up signal 56 from the circuit 26.

The output of the latch 72 and the call/picked-up signal 56 are input into an AND-gate 74. The output of the AND-gate 74 is applied to selectively activate and deactivate a message generator 76. The message generator 76 can simply be a circuit for producing a "beep" signal to be sent to the telephone handset after it is picked up so as to notify an alarm set-off or it can be a tape recorder or other devices.

The message generator 76 is activated when an alarm is set off and when the call/picked-up signal 56 is active, in other words, when the handset 7 of the telephone set 4 is picked up as a result of an alarm.

The output of the message generator 76 is connected to an amplifier circuit 80 which converts the output into a standard telephone signal. The output of the amplifier circuit 80 is connected to one input of a switch 82. The other input of switch 82 is connected to the "line-in" terminal 20. The switch 82 operates under the control of the output of the AND-gate 74 so that when the handset 7 is picked up as a result of an alarm, the output of the amplifier circuit 80 is connected to the "line-out" terminal 5 for transmission to the telephone set 4. For use with the aforementioned conventional telephone connection, block 82 also represents two switches (one for switching the "Ring" signal and the other for switching the "Tip" signal) which operate in the same way under the same control signal.

The call/picked-up signal 56 is also connected to an inverter 84 in the circuit 70. The output of inverter 84 is applied to the reset (R) input of latch 72. When the handset 7 is replaced, latch 72 is reset, thereby deactivating the message generator 76 and causing switch 82 to reconnect the "line-in" terminal 20 with the "line-out" terminal 22. Thus, if the alarm is not set off, telephone set 4 operates as a standard telephone.

If the message generator 76 is a tape recorder, the tape is automatically rewound when the latch 72 is reset.

In an enhanced embodiment, alarm memory 48 can store more than one alarm set-off time. Moreover, different messages can be recorded in the message generator 76 so that when a first alarm is set off, a first message (e.g., details, such as time, place, person, subject, of a first appointment) can be announced over the telephone. When the handset 7 is replaced, the message generator 76 is advanced to the beginning of the next message, so that when the next alarm is set off, the next message can be announced over the telephone.

Figure 5:
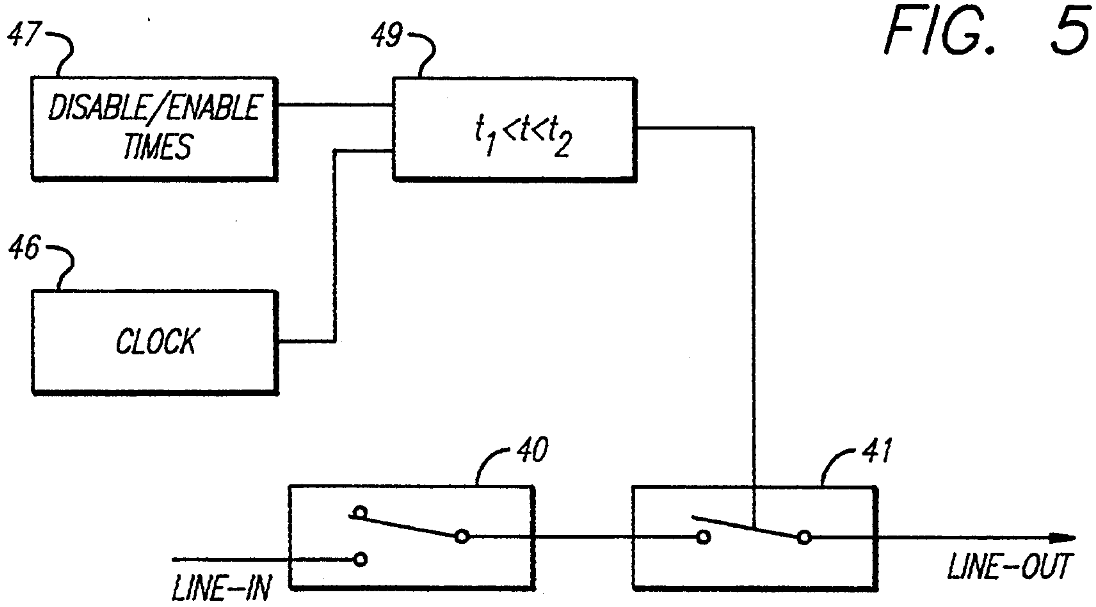
FIG. 5 is a circuit for further enhancing the alarm clock circuit of FIG. 3.

With reference to FIG. 5, the alarm clock 6 can be further enhanced by storing, in the alarm memory 48, a time instant T1 for disconnecting the telephone set 4 and a time instant T2 for reconnecting the telephone set 4. T1 and T2 are compared with the output t of the time-of-day clock 46 at a comparator 49. When $T1 < t < T2$ (e.g., when a user is sleeping), output of the comparator 49 operates to disconnect a switch 41 which has a series-relation with switch 40, thereby disconnecting "line-in" from "line-out" and disabling the telephone set 4. When $t < T1$ or $t > T2$, switch 41 is reconnected, thereby re-enabling the telephone set 4. For use with the aforementioned conventional telephone connection, block 41 also represents two switches (one for switching the "Ring" signal and the other for switching the "Tip" signal) which operate in the same way under the same control signal.

While the preferred embodiments have been described and illustrated, various modifications and substitutions may be made thereto without departing from the scope of the invention.

For example, a battery backup can be provided for continuing the operation of the alarm clock 6 even when the AC power supply is down. When a battery backup is provided, a conventional power failure detection circuit is used to detect a power failure, the battery backup takes control and supplies the power to the circuit 26.

In addition, an internal ringing mechanism and an open-circuit detector can be added to the alarm clock 6. The open circuit detector operates to detect whether "line-out" is open. If "line-out" is open, that means the alarm clock 6 is not connected to a telephone set. In this case, the internal ringing mechanism is switched in automatically and the alarm clock 6 then functions as a regular alarm clock.

Therefore, it is understood that the present invention has been described by way of illustration and not limitation and that the scope of the invention is defined by the following claims.

What is claimed is:

1. A telephone ringing personal alarm clock comprising:

an alarm clock for use in a room by an individual desiring to be awoken in that room;

alarm set means in the alarm clock for adjustment in the room to designate an alarm time;

a time of day clock in the alarm clock;

means responsive to the alarm time and time of day clock for producing an alarm signal in accordance with the setting of the alarm time;

line in means for connecting the alarm clock to a conventional single line wall telephone outlet;

line out means for connecting the alarm clock to a conventional single line telephone set;

handset status means in the alarm clock for determining an on-hook or off-hook status of the telephone set;

incoming call means in the alarm clock for connecting the telephone set to the telephone outlet in response to an incoming telephone call if the on-hook status has been detected;

outgoing call means in the alarm clock for connecting the telephone set to the telephone outlet if the off-hook status has been detected;

alarm means in the alarm clock responsive to the alarm signal for producing a simulated telephone ringing signal; and detector means in the alarm clock for applying the simulated telephone ringing signal to the telephone set if the on-hook status is detected, whereby the individual may directly set the alarm time in the room in which the individual desires to be awoken, the individual may receive the alarm via simulated ringing of the telephone without connection to any telephone services outside of the room and the individual may achieve a connection to such outside telephone services at any time by placing the telephone set in the off-hook status.

2. The invention of claim 1, wherein the detector means further comprises:

means for terminating the simulated telephone ringing signal when the off-hook status is detected.

3. The invention of claim 2, further comprising:

means for providing a message to the individual via the telephone set in response to the alarm signal.

4. A method of providing a simulated hotel room wake up call service, comprising the steps of:

connecting an alarm clock in series between a telephone set and a telephone outlet in a room in which an individual desires to be awoken;

designating an alarm time in response to a setting of the alarm time in the alarm clock by the individual;

producing an alarm signal in accordance with the setting of the alarm time;

determining an on-hook or off-hook status of the telephone set;

connecting the telephone set to the telephone outlet in response to an incoming telephone call if the on-hook status has been detected;

connecting the telephone set to the telephone outlet if the off-hook status has been detected;

producing a simulated telephone ringing signal in response to the alarm signal; and applying the simulated telephone ringing signal to the telephone set if the on-hook status is detected, whereby the individual may directly set the alarm time in the room in which the individual desires to be awoken, the individual may receive the alarm via simulated ringing of the telephone without connection to any telephone services outside of the room and the individual may achieve a connection to such outside telephone services at any time by placing the telephone set in the off-hook status.

5. The invention of claim 4, wherein the step of applying the simulated telephone ringing signal to the telephone set further comprises the step of:

terminating the simulated telephone ringing signal when the off-hook status is detected.

6. The invention of claim 5, further comprising the step of:

providing a message to the individual via the telephone set when the off-hook status is detected.

* * * * *